United States Patent [19]
Johnson

[11] Patent Number: 5,771,921
[45] Date of Patent: Jun. 30, 1998

[54] PRESSURE REGULATOR

[75] Inventor: Dwight N. Johnson, Carlsbad, Calif.

[73] Assignee: CTB, Inc., Milford, Ind.

[21] Appl. No.: 530,083

[22] Filed: Sep. 19, 1995

[51] Int. Cl.[6] .................................................. G05D 16/02
[52] U.S. Cl. .................... 137/505; 137/491; 137/505.42; 137/881; 251/297
[58] Field of Search .................................. 137/491, 505, 137/505.42, 881; 251/61.1, 297

[56] References Cited

U.S. PATENT DOCUMENTS

| | | | |
|---|---|---|---|
| 246,088 | 8/1881 | Curtiss | 137/491 |
| 474,244 | 5/1892 | Hanson | 137/491 |
| 2,946,344 | 7/1960 | Mott | 137/491 X |
| 3,895,645 | 7/1975 | Johnson | 137/403 |
| 3,922,111 | 11/1975 | Deters | 137/491 X |
| 4,065,095 | 12/1977 | Johnson . | |
| 4,180,096 | 12/1979 | Johnson . | |
| 4,240,606 | 12/1980 | Johnson . | |
| 4,344,456 | 8/1982 | Hostetler | 137/403 |
| 4,345,619 | 8/1982 | Johnson . | |
| 4,574,826 | 3/1986 | Johnson . | |
| 4,619,436 | 10/1986 | Bonzer et al. | 251/61.1 |
| 4,646,779 | 3/1987 | Johnson . | |
| 4,696,320 | 9/1987 | Bull | 137/505 X |
| 5,174,331 | 12/1992 | Steudler | 137/507 X |
| 5,255,703 | 10/1993 | Johnson | 137/428 |

*Primary Examiner*—Stephen M. Hepperle
*Attorney, Agent, or Firm*—Trexler, Bushnell, Giangiorgi & Blackstone, Ltd.

[57] ABSTRACT

A pressure regulator for supplying water to an associated watering system for poultry or the like includes a top works structure and a bottom works structure which are formed of few parts, which are easy to manufacture and assemble together. The top works structure includes a cover seated within a cover and a reference spring assembly which includes a reference spring and a diaphragm membrane. The reference spring assembly can be adjusted to vary the outlet pressure of the regulator. The bottom works structure includes a body having an inlet through which water flows into the regulator from a supply and an outlet through which water flows out from the regulator to the associated watering system. A structure is provided for substantially isolating said diaphragm from water pressure in said regulator during flushing of the regulator and the associated watering system and during conditions of higher-demand for water. An ejector tube arrangement is provided in the housing outlet for boosting the flow of water through the regulator under a higher demand condition.

26 Claims, 6 Drawing Sheets

PRESSURE REGULATOR

BACKGROUND OF THE INVENTION

This invention is generally directed to a novel pressure regulator that, for example, can be used on a poultry watering system having cups or nipples drinkers.

Prior art pressure regulators, and specifically, pressure regulators that are used for supplying drinking water to poultry watering systems, typically are directly operating with a continuous mechanical connection between a sensing diaphragm and a control valve member or flow controlling member via a reference spring. Because system pressures are typically in the range of only a few inches of water, sufficient force to directly manipulate the control valve member requires the area of the diaphragm to be relatively large, and such regulators often provide poor response and sensitivity to small changes in water demand and system water pressure.

The system pressure at a constant flow demand is greatly influenced by changes in supply pressure due to a pressure imbalance acting on the valve control member which generates a force that must be counteracted by the diaphragm. This imbalance force is typically additive to the reference spring force, and causes an elevation of outlet pressure setting as the inlet pressure is increased. As the valve control member is stroked open to accommodate the increased flow demand, the system pressure under conditions of higher flow demand typically sags or falls off due to relaxation of the reference spring and reduction of the effective area of the diaphragm. To provide an uncontrolled, high volume thruput flow of water, prior art regulators are often plumbed or equipped with a bypass valve to flush out the connected watering system, or use various types of mechanisms to disable the regulator which forces the diaphragm and/or the valve control member to the open position.

The above methods of providing an override feature for flushing out the connected watering system subject the diaphragm to an excessive and uncontrolled pressure, which in the case of a blocked downstream system, can rise to a level equal to the supply pressure to the regulator and could damage the regulator. In addition, prior art regulators typically rely on the reference spring force to generate sufficient friction in the adjustment structure to secure the regulator setting against accidental turning of the adjustment knob. This approach of securing the regulator setting is usually inadequate because the friction level created in the adjustment structure will vary with the reference spring force and can result in insufficient retention of the regulator setting when the regulator is adjusted to deliver water at low outlet pressures.

The present invention is intended to overcome or minimize these problems as well as to present several other advantages and improvements over prior art pressure regulators.

OBJECTS AND SUMMARY OF THE INVENTION

A general object of the present invention is to provide a novel pressure regulator used, for example, in supplying drinking water to a poultry watering system of cup type, or nipple type design.

A more specific object of the present invention is to provide a novel pressure regulator with a servo-type valve control member, which features an integral override control that relies only on a reference spring force to command the servo valve fully open, irrespective of the pressure delivered to the outlet of the regulator, thereby providing a selectable, high pressure and high volume thruput of supply water, for flushing out the connected watering system.

Another object of the present invention is to provide a novel pressure regulator which features a diaphragm membrane that is not subjected to higher water pressure during the flushing of the connected watering system and the regulator.

Yet another object of the present invention is to provide a novel pressure regulator which features an aspirator or ejector configuration in the outlet flow path that, with increased flow, produces an artificially low feed back pressure to a diaphragm chamber and causes the regulator to "boost" its system pressure under conditions of higher flow demand, and thereby compensates for pressure loss in the connected watering system, when flow demand for drinking water is higher.

An object of the present invention is to provide a novel pressure regulator having a compact design.

A further object of the present invention is to provide a novel pressure regulator that has an adjustment knob structure for setting a desired outlet pressure setting which can also be adjusted to take an individual regulator off-line so that the regulator will not allow water to pass therethrough so that maintenance can be performed on the individual regulator.

Briefly, and in accordance with the foregoing, the present invention comprises a pressure regulator used in supplying water to, for example, an associated watering system for poultry or the like. The pressure regulator includes a top works structure and a bottom works structure which are formed of few parts and are easy to manufacture and assemble together. The top works structure includes a cap seated within a cover and a reference spring assembly which includes a reference spring and a diaphragm membrane. The reference spring assembly can be adjusted to vary the outlet pressure of the regulator. The bottom works structure includes a body having an inlet through which water flows into the regulator from a supply and an outlet through which water flows out from the regulator to the associated watering system. A structure is provided for substantially isolating the diaphragm from higher water pressure during flushing of the regulator and the associated watering system and during conditions of higher-demand for water. An ejector tube arrangement is provided in the housing outlet for boosting the flow of water through the regulator under higher-demand conditions.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
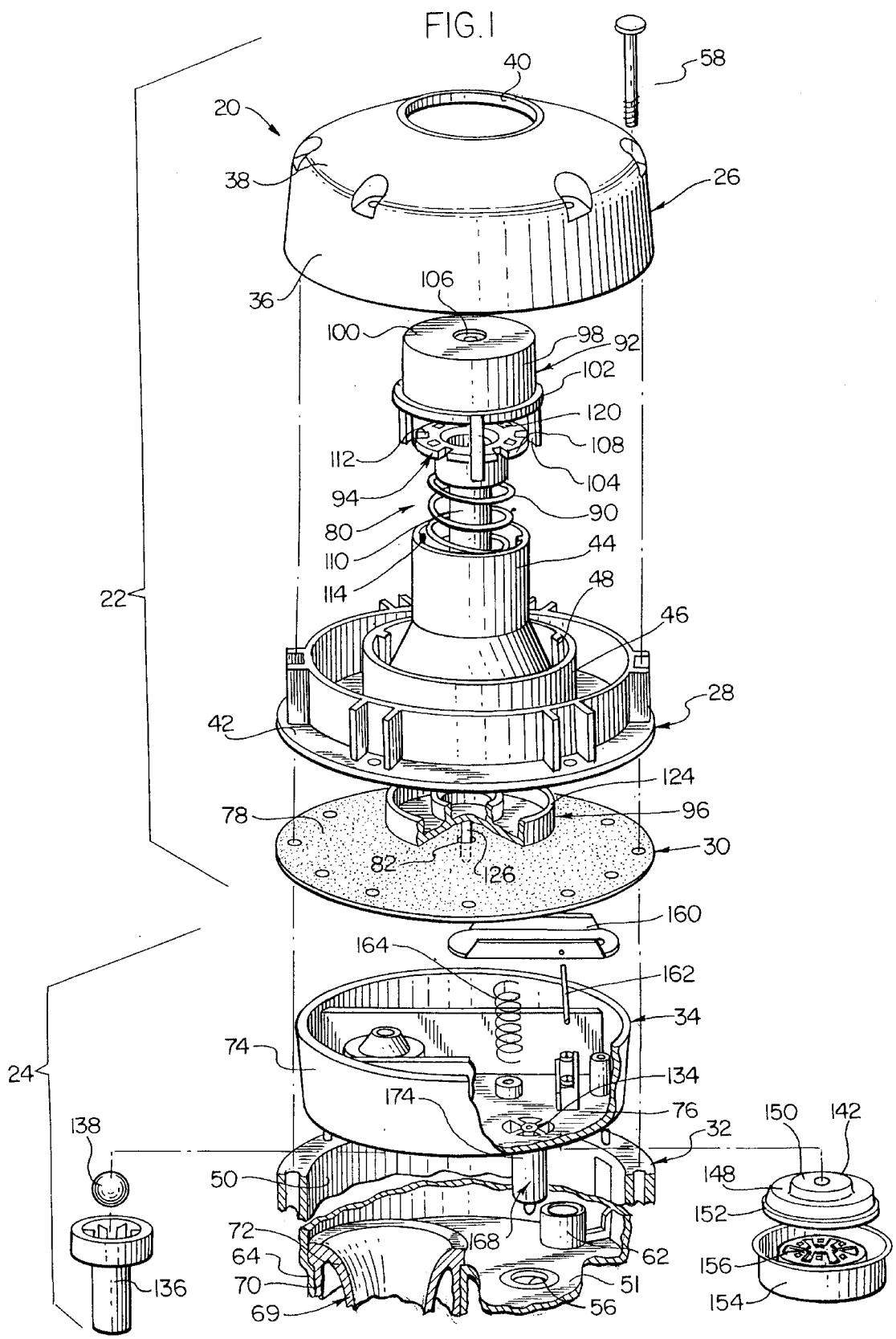
FIG. 1 is an exploded, perspective view of a pressure regulator which incorporates the features of the invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention discloses a novel pressure regulator 20 that is used to supply drinking water to a poultry watering system (not shown) of cup type, or nipple type design. The novel regulator 20 of the present invention is of a compact design, with a servo-type valve control member, and features an integral override control that relies only on a reference spring force to command the servo valve fully open, irrespective of the pressure delivered to the outlet of the regulator 20, thereby providing a selectable, high pressure and high volume thruput of supply water for flushing out the connected watering system. The regulator 20 also features an ejector configuration in the outlet flow path that, with increased flow, produces an artificially low feed back pressure to a diaphragm chamber and causes the regulator to "boost" its system pressure under conditions of higher flow demand and thereby compensates for a customary pressure loss in the connected watering system when flow demand for drinking water is higher. Furthermore, the novel regulator 20 of the present invention includes a top works structure which allows the regulator 20 to be easily taken out of service in the watering system.

I. Structure Of The Regulator

The regulator 20 includes a top works structure 22 and a bottom works structure 24. The top works structure 22 generally includes a cover 26, a cap 28 and a diaphragm assembly 30. The bottom works structure 24 generally includes a body 32 and a bulkhead 34. The cover 26 of the top works structure 22 and the body 32 of the bottom works structure 24 form the outer housing of the regulator 30.

The cover 26 is formed from a side wall 36 which is generally cylindrically shaped and a top wall 38 which is integrally connected to the side wall 36 and generally closes an upper end of the regulator 20. The top wall 38 of the cover 26 has an aperture 40 therethrough for reasons described herein. The cover 26 is preferably made of a suitable material, such as plastic, and is formed by a suitable technique, such as injection molding.

The cap 28 is seated within the cover 26 and is connected to the cover 26 along the rim of a lower portion of the cap 28 by suitable means, such as screws (not shown), which are engaged through aligned apertures (not shown) in the cap 28 and the cover 26. An inner, generally cylindrical wall 44 is integrally formed with the lower portion 42 and extends upwardly therefrom and through the aperture 40 in the cover 26. The inner cylindrical wall 44 of the cap 28 is spaced from the top wall 38 of the cover 26 thereby forming a circular slot therebetween.

An outer, generally cylindrical wall 46 extends upwardly from the lower portion 42 of the cap 28 and is spaced from and encircles the inner wall 44. A plurality of elongate ribs 48 protrude inwardly from the inner surface of the outer wall 46 towards the inner wall 44 and are spaced apart from each other for reasons described herein. The ribs 48 run along the height of the outer wall 46.

The body 32 is formed of a side wall 50 which is generally cylindrically shaped and a bottom wall 51 which is integrally formed with the side wall 50 and generally closes a lower end of the regulator 20. The bottom wall 51 has a plurality of ports 52, 54, 56 therethrough. Port 52 provides an inlet for water to pass into the regulator 20. Port 54 provides an outlet for water to pass out of the regulator 20 and port 56 provides a drainage port for the water to pass out of the regulator 20 when the regulator 20 is being flushed as described herein. The cap 28 and the body 32 are connected together along like-shaped mating surfaces by a plurality of screws 58 or the like (only one of which is shown) which pass through a plurality of aligned apertures in the cover 26, the cap 28 and the body 32.

A generally cylindrical sleeve 60 extends downwardly from the bottom wall 51 of the body 32 around the inlet port 52 and provides a connection for connecting a water supply pipe 61 thereto. In addition, an inlet conduit 62, which is the same size as the inlet port 52, is provided on the opposite side of the bottom wall 51 at a position above the inlet port 52. A generally cylindrical sleeve 64 extends downwardly from the bottom wall 51 of the body 32 around the outlet port 54 and provides a connection for connecting a tube 66 from the associated watering system thereto. The sleeve 64 has an O-ring 68 at its end to seal the connection between the sleeve 64 and the tube 66. The sleeves 60, 64 and conduit 62 may be formed as integral parts of the body 32 or as separate members which are attached to the body 32 by suitable means, such as adhesive. The components are made of a suitable material, such as plastic, and are formed by a suitable technique, such as by injection molding.

Figure 7:
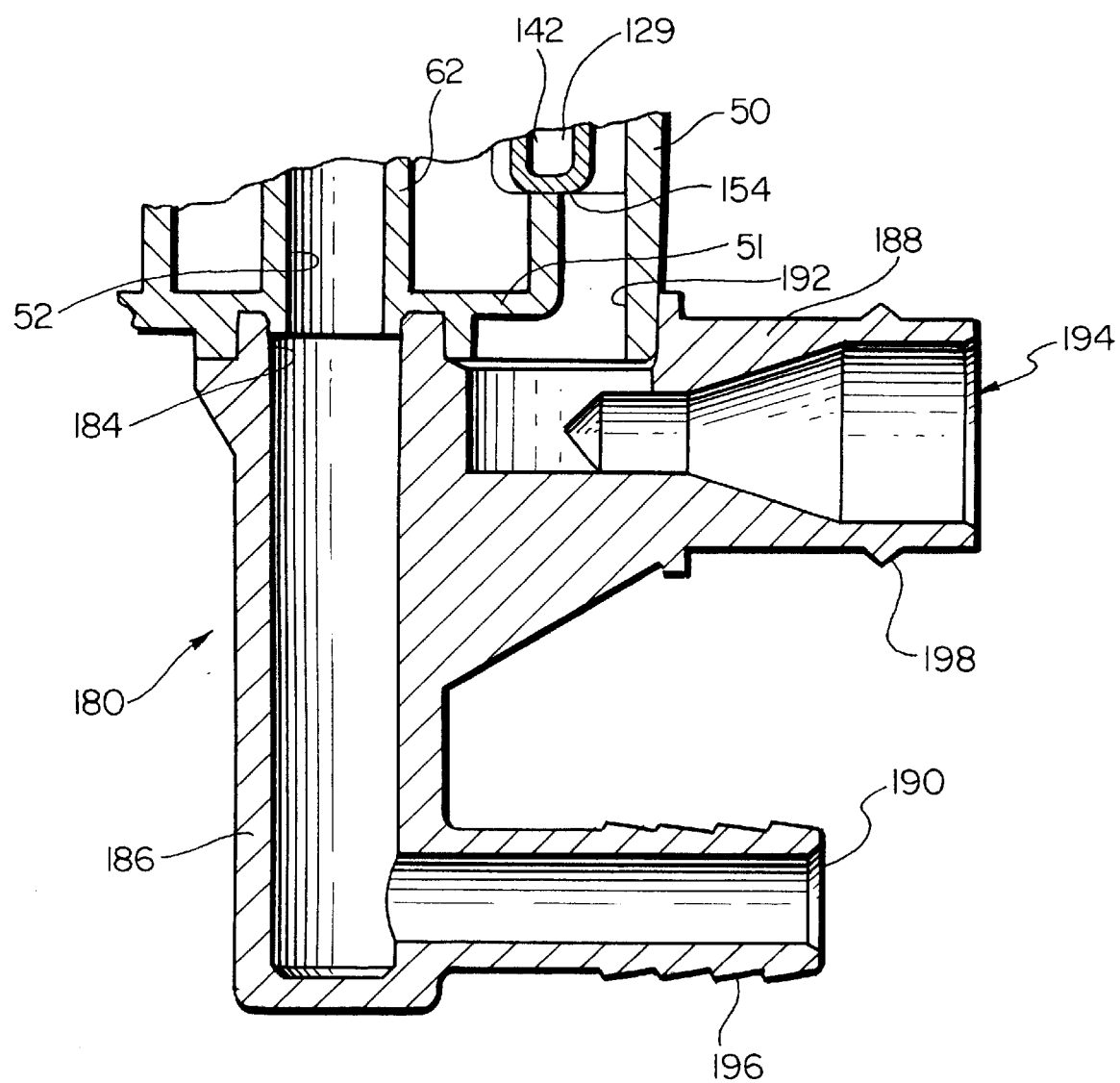
FIG. 7 is a cross-sectional view of an alternate structure for around the inlet of the pressure regulator of the present invention which allows a stand pipe to be attached to the pressure regulator to measure the outlet pressure of the pressure regulator.

Alternatively, as shown in FIG. 7, the inlet sleeve 60 may be eliminated and instead, connector 180 can be connected to the body 32 around the inlet port 52 so that a stand pipe (not shown) can be attached thereto to measure the outlet pressure of the regulator 20, and so that an inlet supply hose (not shown) can be attached thereto. The connector 180 is suitably attached to the bottom wall 51 of the body 32 around the inlet port 52 of the regulator 20 by suitable means, such as glue.

The connector 180 has a supply conduit 186 and a stand pipe conduit 188 formed therein. An outlet port 184 is provided at one end of the supply conduit 186 which is connected to the inlet port 52 of the regulator 20. An inlet port 190 is provided at the opposite end of the supply conduit 186. A plurality of hose barbs 196 are provided on the exterior of the connector 180 at or near the inlet port 190 for attaching a supply hose, such as a garden hose.

As noted above, the connector 180 also includes a stand pipe conduit 188 formed therein. In the alternative embodiment of FIG. 7, the body 32 of the regulator 20 has also been modified to provide an outlet port 192 through the bottom wall 51 of the regulator 20. The stand pipe conduit 188 extends through the connector 180 from the outlet port 192 to a stand pipe connection port 194. Around the exterior of the connector 180 at or near the stand pipe connection port 194, a rib 198 is provided for attaching a stand pipe, such as a twenty four inch, clear PVC stand pipe, thereto. The stand pipe measures the outlet water pressure of the regulator, as described herein.

It should be clearly understood that the supply conduit 186 and the stand pipe conduit 188 are not in fluid communication with each other and that the conduits 186 and 188 do not have to be perpendicular to the main portion 182 as shown, but that this merely constitutes one design.

Figure 2:
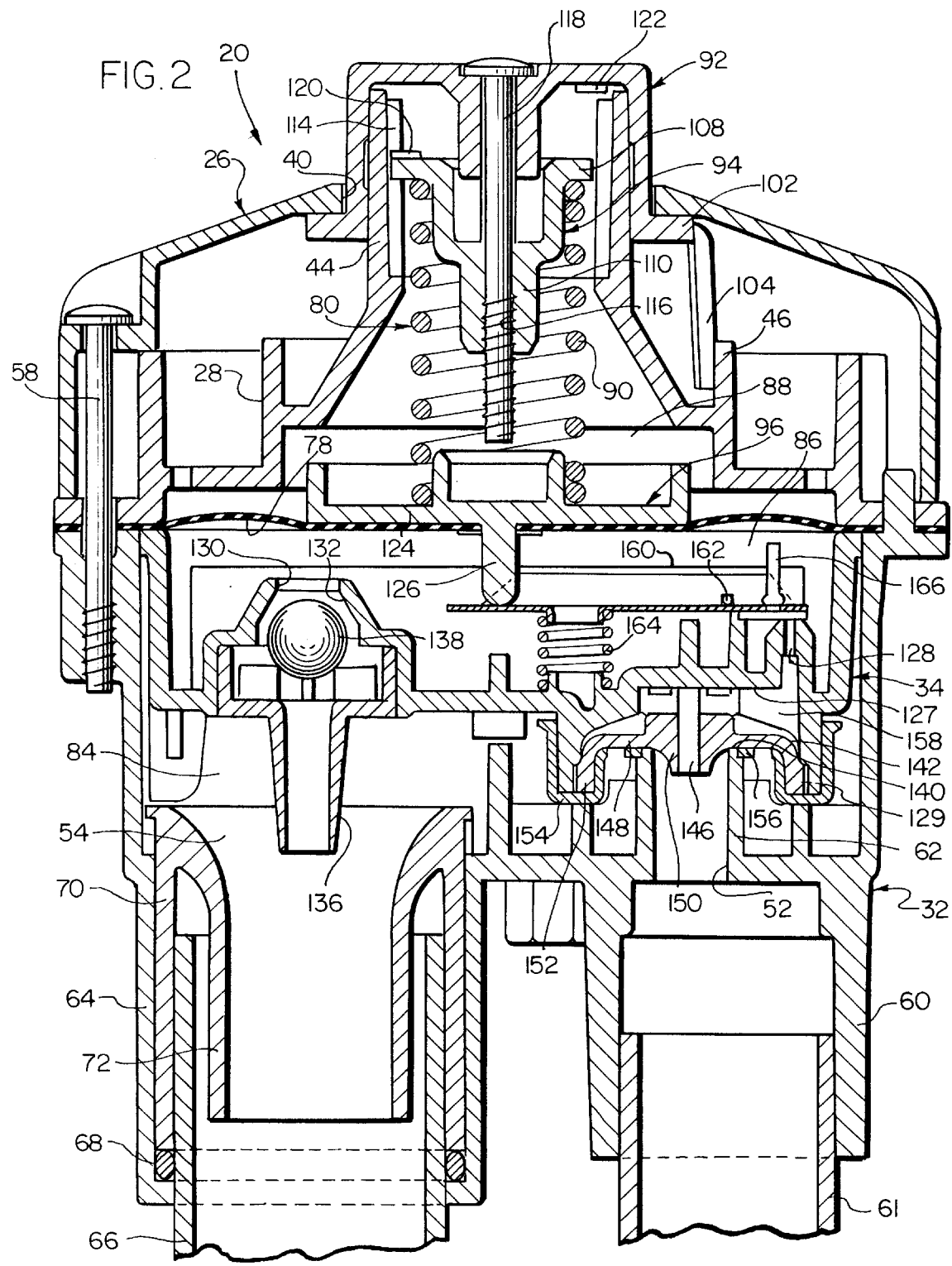
FIG. 2 is a cross-sectional view of the pressure regulator of FIG. 1 in a fully assembled condition without any water flowing through the regulator.

Referring now to FIG. 2, in addition to the sleeve 64 which surrounds the outlet port 54, an outlet conduit 70 having a tapered inner throat or wall 72 is seated in the sleeve 64 and surrounds the outlet port 54, for reasons described herein. The outlet conduit 70 is formed of a suitable material, such as plastic, and may be formed as an integral part of the body 32 or as a separate member and attached thereto by suitable means, such as by adhesive or by a friction fit.

The bulkhead 34 is seated within the body 32 and has a generally cylindrical side wall 74 and a bottom wall 76 which closes the lower end of the side wall 74. An upper portion of the side wall 74 abuts against the inner surface of the body side wall 50 when seated therein.

The diaphragm assembly 30 generally includes an elastomeric diaphragm membrane 78, which function is described in detail herein, and a reference spring structure 80. The diaphragm membrane 78 is mounted between the cap 28, and thus the cover 26, and the bottom works structure 24 of the regulator 20. The diaphragm membrane 78 is generally a flat, flexible, circular, elastomeric member which is sized so as to completely separate the cap 28, and thus the cover 26, from the bottom works structure 24. The outer margin of the diaphragm membrane 78 is positioned at the juncture between the cap 28, the body 32; the bulkhead 34 and the cover 28 so as to provide a seal therebetween. The outer margin of the diaphragm membrane 78 includes a plurality of apertures through which the screws 58 pass when the regulator 20 is fully assembled. In effect, the cap/cover combination clamps the diaphragm membrane 78 onto the bottom works structure 24 of the regulator 20. The center of the diaphragm membrane 78 has an aperture 82 therethrough for reasons described herein.

As a result of the construction of the regulator 20, a first chamber 84, called the "main chamber" herein, is formed between the bulkhead 34 and the body 32. A second chamber 86, called the "diaphragm chamber" herein, is formed between the bulkhead 34 and the diaphragm membrane 78 and a third chamber 88, called the "reference chamber" herein, is formed between the diaphragm membrane 78 and the cap 28. The diaphragm membrane 78 prevents fluid communication through the juncture between the bulkhead 34 and the body 32, between the bulkhead 34 and the cover 28 and between the body 32 and the cap 26. The reference chamber 88 is always water-free.

The reference spring structure 80 is provided within the reference chamber 88. The reference spring structure 80 includes a reference spring 90, an adjustment knob 92, a spring follower member 94 and a spring leader member 96.

The adjustment knob 92 is generally formed from a cylindrical side wall 98, a top wall 100, a lip 102 and a plurality of tines 104 which depend downwardly from the lip 102. While three tines 104 are shown in the drawings, it is to be understood that more or less tines can be used without departing from the scope of the invention. The top wall 100 is integrally formed with the side wall 98 and generally closes the upper end of the knob 92 with the exception of an aperture 106 through the knob top wall 100. The knob 92 is made of a suitable material, such as plastic, and formed by suitable means, such as molding.

The knob 92 is positioned within the circular slot between the inner cylindrical wall 44 of the cap 28 and the top wall 38 of the cover 26. The outer margin of the underside of the knob top wall 100 engages against the topmost end of the cylindrical wall 44 of the cap 28. The lip 102 of the knob 92 engages beneath the cover top wall 38. The aperture 40 in the cover 26 is slightly larger than the diameter of the knob 92 and the circular slot is approximately equal to the width of the side wall 98 of the knob 92. The adjustment knob 92 can be rotationally displaced relative to the cover 26 and the cap 28, but cannot be axially displaced relative thereto.

The adjustment knob 92 used in the present invention is non-rising. The outer surface of the tines 104 abut against the inner wall of the outer wall 46 of the cap 28 in the spaces between the elongate ribs 48. The engagement of the tines 104 within the spaces between the ribs 48 prevents or deters an accidental change in the set point of the regulator 20 (the "set point" is described herein) once it is set. This prevention or at least determent is provided by friction and/or detentes.

The spring follower member 94 is non-rotatably mounted within the inner wall 44 of the cap 28 and has a top wall 108 and a bottom portion 110 which extends downwardly from the top wall 108. The outer margin of the top wall 108 has slots 112 therein which engage protruding ribs 114 on the inner surface of the inner wall 44 of the cap 28 to prevent rotation of the spring follower member 94 relative to the cap 28. The bottom surface of the top wall 108 engages a first or upper end of the reference spring 90 by suitable means. The bottom portion 110 of the spring follower member 110 has a threaded aperture 116 therethrough.

A self tapping screw 118 engages both the adjustment knob 92 and the spring follower member 94 through the respective apertures 106, 116. The screw 118 is affixed against rotation with respect to the adjustment knob 92 such that rotation of the adjustment knob 92 produces a corresponding rotation of the screw 118. When the knob 92 is rotated, the screw 118 rotates which causes the spring follower member 94 to slide along the length of the inner wall 44 and become axially displaced relative to the cover 28 for reasons described herein.

A plurality of spaced, cam surfaces 120, 122 are provided on the upper surface of the top wall 108 of the spring follower member 94 and on the lower surface of the top wall 100 of the knob 92, respectively. The cam surfaces 120 on the spring follower member 92 engage with the cam surfaces 122 on the adjustment knob 92 to stop the operator from backing the adjustment knob 92 out so far that the spring follower member 94 threads against the knob 92, which could possibly strip the threads on the screw 118. The cams 120, 122 create a positive and definite stop without upward thrust between the adjustment knob 92 and the spring follower member 94.

The spring leader member 96 has a main portion 124 and a stem portion 126 which extends downwardly from the main portion 124. The second or lower end of the reference spring 90 engages against the upper face of the main portion 124. Thus, the reference spring 90 is engaged between the spring follower member 94 and the spring leader member 96. The lower face of the main portion 124 abuts against the diaphragm membrane 78 and the stem portion 126 extends through the aperture 82 in the center of the diaphragm membrane 78 and into the diaphragm chamber 86.

Directing attention back to the bulkhead 34, the specifics of the bulkhead 34 will now be described. The bottom wall 76 of the bulkhead 34 has a generally concave wall 127 formed thereon through which a pilot orifice 128 is provided. An annular wall 129 extends downwardly from the bottom surface of the bulkhead 34 around the concave wall 127. The bottom wall 76 of the bulkhead 34 is also provided with an outlet port 130, through which water can flow from the diaphragm chamber 86 to the outlet conduit 70 of the regulator 20. A tapered seat 132 is provided on the underside of the outlet port 130. In addition, a drainage port 134 is provided through the bottom wall 76 of the bulkhead 34, through which water flows when the regulator 30 and associated watering system are being flushed as described herein.

An ejector tube 136, which is a relatively small diameter, tubular projection, is provided on the underside of the bottom wall 76 of the bulkhead 34 around the outlet port 130. The ejector tube 136 houses a buoyant check ball 138 therein. The check ball 138 can float up or be forced up into engagement with the tapered seat 132 in the bulkhead 34 so as to block any flow of water up through the outlet port 130 as described herein. When the bulkhead 34 is seated within the body 32, the ejector tube 136 is centrally located within the tapered throat of the outlet conduit 70, and extends therein to a predetermined extent as discussed more thoroughly below.

The novel regulator 20 of the present invention includes a servo valve control which includes a main valve seat 140, which is formed on the end of the inlet conduit 62, and a main valve disc 142 and which allows water to flow from the supply, through the main valve disc 142 and associated structure, as described more fully hereinbelow, and subsequently into the diaphragm chamber 86, under normal and higher demand for water conditions. The components of the servo valve control are substantially similar in construction and in operation, as used in the float operated toilet tank fill valve that is disclosed in U.S. Pat. No. 5,255,703 which disclosure is incorporated herein by reference.

A metering pin 146, which has a plurality of grooves along the length of the pin 146, extends downwardly from the center of the generally concave wall 127. The pilot orifice 128 through the wall 127 is offset from the grooved metering pin 146. The grooved metering pin 146 and the pilot orifice 128 provide a passageway for water to pass through between the water supply and the diaphragm chamber 86.

The main valve disc 142 is an elastomeric, disc-like member which includes a flexible annular valving region 148 which extends radially away from a central hub 150. At the outer periphery of the valving region 148, an axially extending rim portion terminates in an enlarged bead 152. An aperture is provided through the center of the hub 150.

A valve cup 154 is used to retain the main valve disc 142 in engagement with the annular wall 129 and positioned between the annular wall 129 on the bulkhead 34 and the inlet conduit 62 so that the valving region 148 of the main valve disc 142 may be seated against the main valve seat 140 during predetermined conditions, as described more fully hereinbelow. The valve cup 154 is generally annular and has a U-shaped wall which is formed from a bottom wall, an inner side wall and an outer side wall. The U-shaped wall forms an annular channel in which the enlarged bead 152 of the main valve disc 142 is received to mount the main valve disc 142 to the valve cup 154. When the disc 142 and cup 154 are mounted on the annular wall 129, the wall 129 is sandwiched between the outer side wall of the cup 154 and the bead 152 of the disc 142 and are held in engagement therewith by suitable means, such as by a friction fit. A plurality of radially inwardly extending flow ports or vanes 156, which function is described herein, are formed along the inner wall of the cup 154.

When the cup 154 and main valve disc 142 are engaged with the annular wall 129, the main valve disc 142 is proximate to the wall 127, but not in engagement therewith, and the grooved metering pin 146 extends through the aperture in the center of the disc 142. It is to be noted that the main valve disc 142 does not abut against the wall 127 such that a space 158 is provided between the main valve disc 142 and the wall 127. This space 158 is called the "control chamber" herein.

Within the diaphragm chamber 86, a generally U-shaped lever 160 is pivotally mounted to the bulkhead 34 by suitable means, such as a metal pin 162. A lever return spring 164 is connected along the length of the lever 160 between the lever 160 and the bulkhead 34. The inner end of the lever 160 is engaged against the stem portion 126 of the spring leader member 96. At the outer end of the lever 160, a hole is provided for mounting an elastomeric pilot seat 166. The pilot seat 166 is aligned with and engaged within the pilot orifice 128 when the lever 160 is in a closed position to prevent the flow of water through the pilot orifice 128, as described hereinbelow. Sufficient clearance is provided between the bulkhead 34 and the cap 28 to permit the lever 160 to pivot between an open position and a closed position around the pivot axis established by the pin 162.

Figure 5:
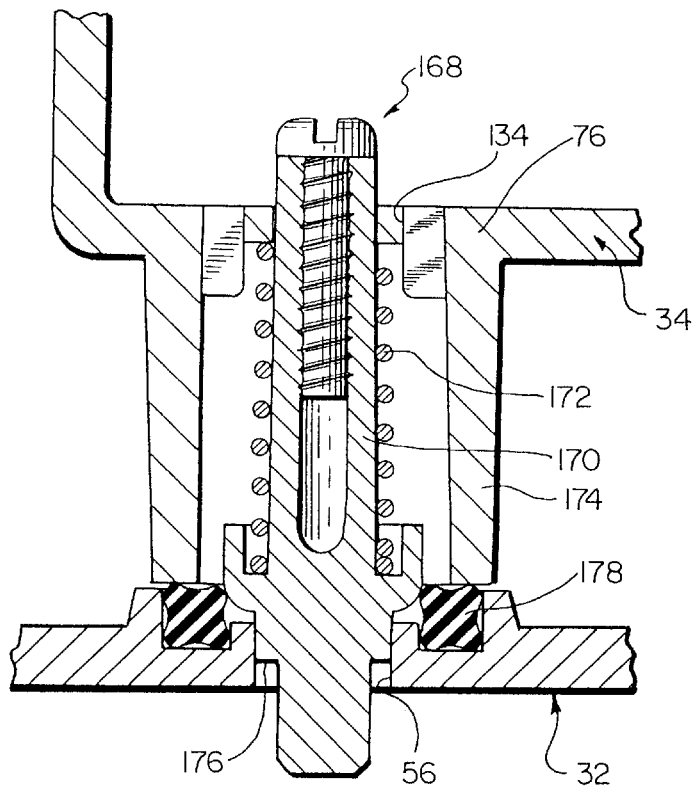
FIG. 5 is a cross-sectional view of a spring loaded poppet which is used to flush the pressure regulator in a closed position.
Figure 6:
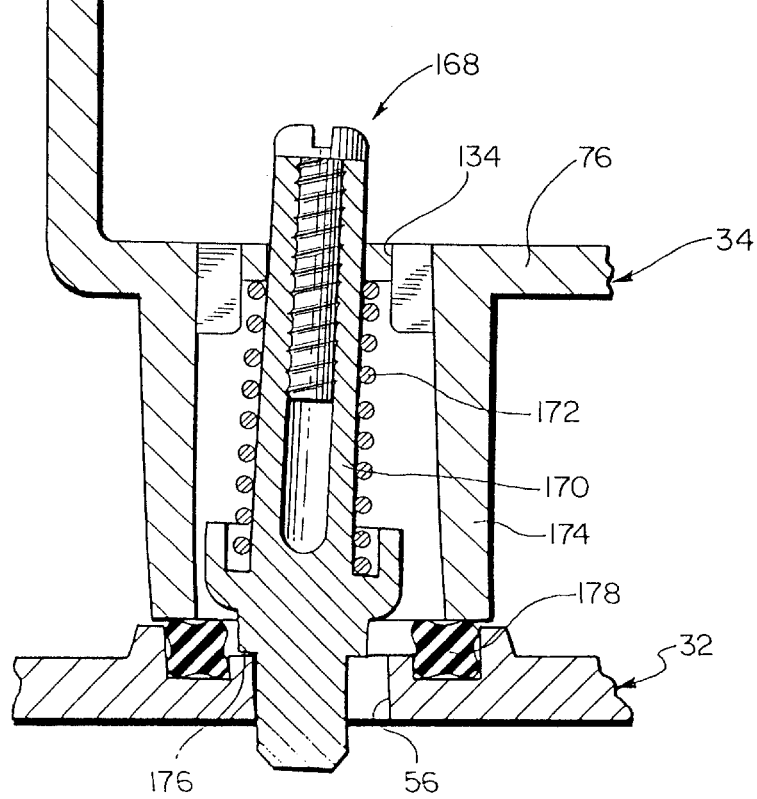
FIG. 6 is a cross-sectional view of the spring loaded poppet shown in FIG. 5 in an open position.

In order to provide for venting of the regulator 20 so that the associated watering system and regulator 20 can be flushed as described hereinbelow, a spring loaded poppet structure 168, as shown in FIGS. 5 and 6, is attached to the bulkhead 34. The poppet 168 is attached to the drainage port 134 in the bulkhead 34 and extends through the drainage port 56 in the bottom wall 51 of the body 32. The poppet 168 includes a poppet stem 170 which is attached to the bulkhead 34 by a spring 172 and is seated within a sleeve 174 that surrounds the drainage port 134. The poppet stem 170 has a shoulder 176 formed along the length of the stem 170 which can be engaged with the area around the drainage port 56 on the body 32.

A "quad-ring" seal 178 is provided along the inside of the body drainage port 56. When the poppet 168 is not being used to vent the regulator 20, the seal 178 engages with the poppet stem 170 to prevent water from draining out of the regulator 20 through the drainage port 56. The poppet 168 can be latched in the open position by pressing the poppet 168 stem into the regulator 20, and offsetting the poppet stem 170 to engage the poppet shoulder 176 on the corresponding face in the regulator body 32.

II. Functioning Of The Regulator Under Various Conditions

Now that the specifics of the structure of the regulator 20 have been described, how the regulator 20 functions under various conditions is described.

A. Setting The Regulator To A Desired Outlet Pressure

Initially, the regulator 20 is empty such that no water is contained in the regulator 20. Thereafter, the regulator 20 is set to the desired set point to provide a setting for adjustment of the regulator outlet pressure by rotating the adjustment knob 92 to a desired position. Rotation of the knob 92 causes the screw 118 to rotate.

Since the spring follower member 94 is fixed against axial rotation due to the engagement of the slots 112 on the top wall 108 with the ribs 114 on inner wall 44 of the cap 28, the rotation of the screw 118 causes the spring follower member 94 to slide and translate along the length of the inner cylindrical wall 44. As the spring follower member 94 translates, the reference spring 90 presses against the spring leader member 96 which causes the diaphragm membrane 78 to flex and push down on the inner end of the lever 160 thereby overcoming the lever return spring 164 and pivoting the lever 160 to an open position such that the pilot seat 166 is moved away from the pilot orifice 128.

Once the desired set point is reached, the knob 92 is deterred from being rotated further because of the engagement of the tines 104 within the slots on the inner cylindrical wall 44. If a user tries to rotate the knob 92 after the set point is reached, the friction generated between the tines 104 and the ribs 114 will indicate to the user that the knob 92 is not intended to be rotated any further. Of course, even when the regulator 20 is being adjusted to the set point, the adjustment knob 92 is deterred from being rotated due to this engagement.

Thus, after the regulator 20 is set and with no water in the regulator 20, the diaphragm membrane 78 is flexed since the reference spring 90 is expanded; the pilot seat 166 is not seated in the pilot orifice 128 such that the pilot orifice 128 is open; the check ball 138 is not seated in the tapered seat 132; and the valving region 148 of the main valve disc 142 is in engagement with the main valve seat 140. The air pressure in the main chamber 84, the diaphragm chamber 86 and the control chamber 158 is equal to atmosphere.

B. Initial Start-Up Of The Regulator

Figure 4:
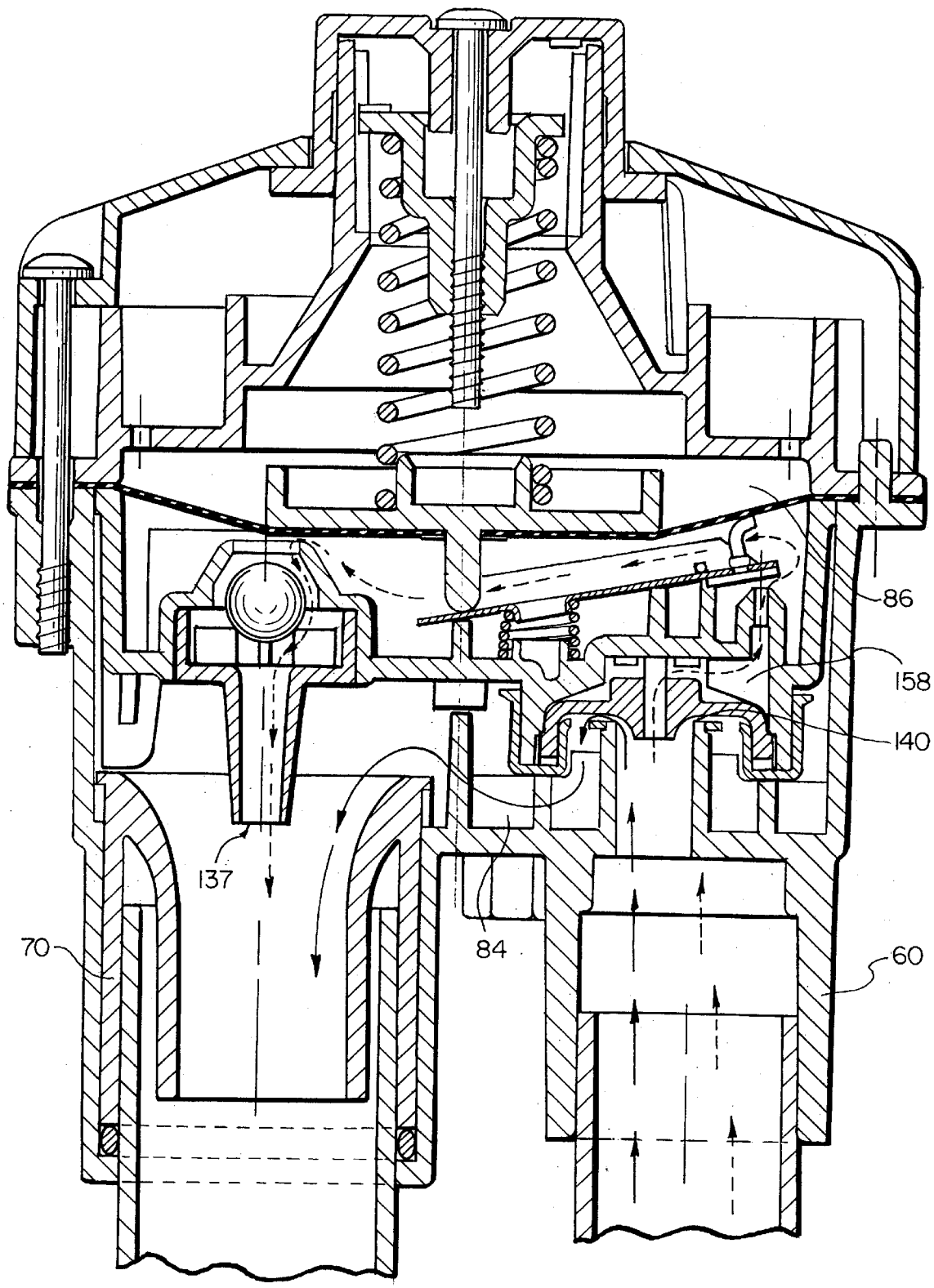
FIG. 4 is a cross-sectional view of the pressure regulator in a fully assembled condition showing water flowing through the pressure regulator during a period of higher-demand for water.

Initially, when the system is started up, water flows from the supply tube 61 into the inlet conduit 60 and against the valving region 148 of the main valve disc 142. If connector 180 is provided, water flows from the supply tube (not shown), through the inlet passageway 190 in the inlet conduit 186 and through the main portion 182, through the inlet conduit 62 and against the valving region 148 of the main valve disc 142. Once the force on the underside of the main valve disc 142 due to the incoming water impinging on the lower surface area of the disc 142 exceeds the force due to atmospheric air pressure in the control chamber 158 acting on the surface area on the other side of the disc 142 to a large enough extent, a pressure differential is created between the underside of the main valve disc 142 and the upperside of the disc 142 which causes the valving region 148 of the disc 142 to lift away from its engagement with the main valve seat 140, as shown in FIG. 4, to expose the radial ports 156 in the valve cup 154. The pressure on the underside of the disc 142 must be sufficiently greater than atmospheric in order to lift the valving region 148 since the underside of the disc has a smaller surface area which the water impinges upon than the surface area on the upperside of the disc 142 which the air pressure acts on in the control chamber 158. Water flows from the supply; between the main valve seat 140 and the lifted valving region 148 of the disc 142; across the radial ports 156 in the cup 154 and through the main chamber 84 to the outlet throat 72. When water flows through the main chamber 84 in this manner, this is called the "open" position of the regulator 20, i.e. a large amount of water passes through the regulator 20 via the lifted main valve disc 142.

In addition, when connector 180 which has a stand pipe connected thereto by suitable means, is provided on the inlet of the regulator 20, water from the main chamber 84 flows through the outlet port 192 in the bottom wall 51 of the body 32 and through outlet conduit 194 to the stand pipe. This measures the outlet pressure of the regulator 20.

Additionally, water slowly, in approximately ten to fifteen seconds, fills the diaphragm chamber 86 by flowing along the grooves in the metering pin 146, into the control chamber 158 and through the open pilot orifice 128. Water that flows through the pilot orifice 128 is called "pilot flow" herein. Water will continue to flow into the diaphragm chamber 86 until a sufficient amount of pressure builds up within the diaphragm chamber 86 to compress the reference spring 90 thereby causing the lever 160 to pivot to the closed position to reseat the resilient pilot seat 166 in the pilot orifice 128.

Water continues to flow into the control chamber 158 via the grooved metering pin 146 to fill the chamber 158. The valving region 148 of the main disc 142 will remain unseated from engagement with the seat 140 until the force on the top side of the disc 142 due to the water pressure acting on the top surface area of the disc 142 exceeds the force acting on the other side of the disc 142 due to the water pressure acting on the lower surface area of the disc 142 to cause the disc 142 to reseat itself into engagement with the seat 140. Thereafter, the pressure regulator 20 operates as described herein depending on the type of flow demanded by the associated watering system.

During the start-up of the regulator 20 and the watering system, the attached watering line fills up quickly since the valving region 148 of the main valve disc 142 is open and water can flow through the regulator 20 as described hereinabove. In addition, only a small amount of stress is placed on the diaphragm membrane 78 since the diaphragm chamber 86 fills slowly via the pilot flow.

C. Standby Condition Of The Regulator

As shown in FIG. 2, after start-up, when there is no demand for water, also called the "standby condition," the regulator 20 and associated watering system are in a state of equilibrium. Water fills the main chamber 84, the control chamber 158, the diaphragm chamber 86, the inlet conduit 60 and the outlet conduit 70. The lever 160 is pivoted to the closed position so that the resilient pilot seat 166 is engaged within the pilot orifice 128. The buoyant check ball 138 is not engaged with the tapered seat 132 in the bulkhead 34. The pressurized water trapped in the control chamber 158 biases the main valve disc 142 down into a closed position such that the valving region 148 of the main valve disc 142 engages the main valve seat 140. If connector 180 is provided as in the alternative embodiment illustrated in FIG. 7, water column in this standby condition can be measured at the stand pipe.

D. Low System Demand For Water

Figure 3:
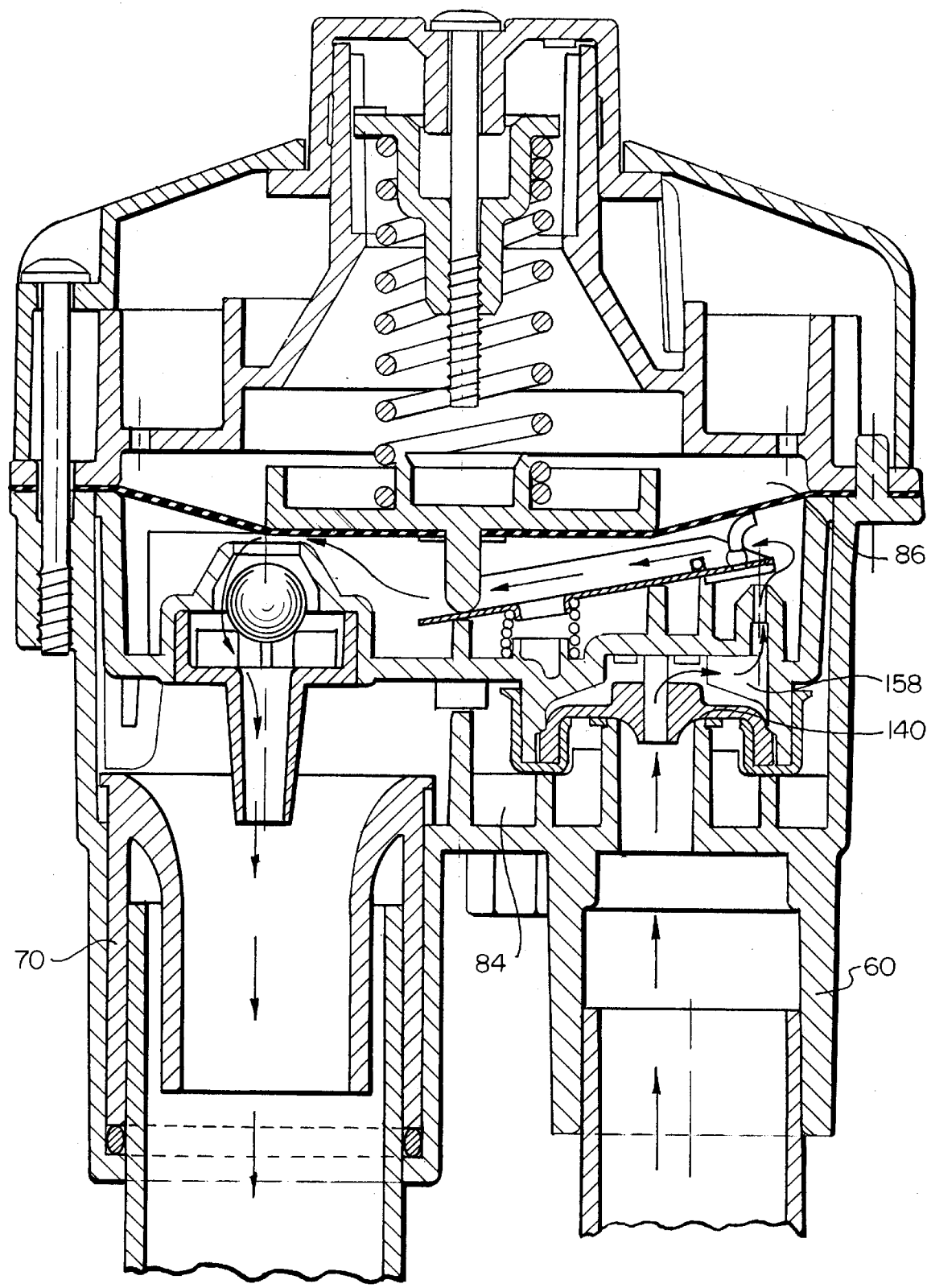
FIG. 3 is a cross-sectional view of the pressure regulator in a fully assembled condition showing water flowing through the pressure regulator during a period of normal-demand for water.

Under a relatively low system demand for water, the path of the water from the supply to the outlet 70 is shown by the arrows in FIG. 3. FIG. 3 is labeled with a minimal amount of reference numerals so that the path of the flow of the water can be clearly seen by the solid arrows. When a relatively low system demand for water occurs, water, and thus pressure, is bled from the outlet conduit 70 and the main chamber 84. This decreases the pressure on the underside of the buoyant check ball 138 causing the check ball 138 to remain unseated from the tapered seat 132 in the bulkhead 34. Next, water, and thus pressure, is bled from the diaphragm chamber 86. As the water bleeds from the diaphragm chamber 86, the pressure in the diaphragm chamber 86 lowers relative to the reference spring setting which, when the pressure decreases to a low enough level, allows the reference spring 90 to expand. As the reference spring 90 expands, a force is exerted on the spring leader member 96 and thus on the diaphragm membrane 78. This causes the diaphragm membrane 78 to flex toward the bulkhead 34 which, in turn, strokes the stem portion 126 of the spring leader member 96 on the inner end of the lever 160 thereby overcoming the lever return spring 164 and causing the lever 160 to pivot to the open position. This action biases the resilient pilot seat 166 away from engagement with the pilot orifice 128 to begin venting of the control chamber 158.

Water from the supply flows through the inlet conduit 60 and against the main valve disc 142. The main valve disc 142 does not unseat from engagement with valve cup 154 since the force in the control chamber 158, due to the water pressure acting on the larger topside surface area of the disc 142, is greater than the force on the underside of the disc 142, due to the water pressure from the supply acting on the smaller underside surface area of the disc 142. Water flows along the grooves in the metering pin 146, into the control chamber 158 and through the pilot orifice 128 thereby providing the small pilot flow into the diaphragm chamber 86. The grooves in the metering pin 146 permit restricted flow from the inlet conduit 62 to the control chamber 158 above the valve disc 142. The small pilot flow enters the diaphragm chamber 86, flows through the bulkhead outlet port 130 and past the unseated check ball 138, and into the main chamber 84. Thereafter, the water finally feeds into the outlet throat 72 of the regulator 20 from the main chamber 84, via the ejector tube 136, to the associated watering system.

If connector 180 and a stand pipe are provided, water from the main chamber 84 is vented through the outlet port 192 in the bottom wall 51 of the body 32 and through outlet conduit 194 to the stand pipe. This measures the outlet pressure of the regulator 20 under the relatively low flow system demand condition.

Water flows from the inlet conduit 62 to the diaphragm chamber 86 as explained hereinabove until the diaphragm chamber 86 is re-pressurized to a sufficient amount to re-compress the reference spring 90. When the reference spring 90 is compressed, the lever 160 pivots to the closed position which causes the pilot seat 166 to re-engage with the pilot orifice 128 thereby preventing any further pilot flow. When the water is bled off so as to lower the pressure in the diaphragm chamber 86 to a low enough level such that the pressure on the diaphragm membrane 78 does not exceed the reference spring force, the reference spring 90 is again allowed to expand and move the resilient pilot seat 166 out of engagement with the pilot orifice 128 so that water can flow into the diaphragm chamber 86 as described hereinabove.

The above pilot control is progressive and continuous, and causes the regulator 20 to modulate the thruput flow of water to maintain a relatively constant pressure in the diaphragm chamber 86, as established by the force provided by the reference spring 90. The greater the compression of the reference spring 90 to which the reference spring 90 is initially set, the greater the amount of pressure is required within the diaphragm chamber 86 to cause the reference spring 90 to return to a compressed state. This action provides throttling control of the output flow, to maintain system pressure at a preset level.

E. Higher System Demand For Water

When the demand for water is higher by the associated watering system, the above-described pilot control flow is insufficient to provide a sufficient supply of water to the watering system. FIG. 4 shows the path of the water from the supply to the outlet 70 under a higher-demand condition for water. The main flow, as described herein, is shown by the solid arrows in FIG. 4. The pilot flow is shown by the dashed arrows in FIG. 4. FIG. 4 is labeled with a minimal amount of reference numerals so that the path of the flow of the water can be clearly seen by the arrows.

Initially, the flow of water through the regulator 20 is similar to the above-described pilot control flow. First, water, and thus pressure, is bled from the outlet conduit 70 and the main chamber 84 which decreases the pressure on the underside of the buoyant check ball 136 which causes the check ball 136 to remain unseated from the tapered seat 132 formed in the bulkhead 34. This allows the water, and thus pressure, in the diaphragm chamber 86 to bleed from the diaphragm chamber 86 through the outlet port 130 in the bulkhead 34 and around the check ball 138. As the pressure is bled from the diaphragm chamber 86, the pressure in the diaphragm chamber 86 lowers relative to the reference spring setting which allows the reference spring 90 to expand which allows a small pilot flow to enter into the diaphragm chamber 86 as described hereinabove to vent the control chamber 158 above the main valve disc 142.

Since the demand for water is higher, the pressure is rapidly bled from the control chamber 158 at such a rate which the restricted flow through the grooves in the metering pin 146 cannot refill the control chamber 158 fast enough to maintain the pressure. As the venting of the control chamber 158 begins to exceed the inflow of supply water to the control chamber 158 via the metering pin 146, a differential pressure is created across the main valve disc 142, from the supply to the control chamber 158, that begins to lift the valving region 148 away from the main valve seat 140 to expose the radial flow ports 156 in the face of the cup 154. In other words, the force acting on the upperside of the main valve disc 142 due to the water pressure within the control chamber 158 acting on the upper surface area of the disc 142 drops to a sufficient extent relative to the force acting on the smaller underside surface area of the disc 142 due to the inlet water pressure to move the main valve disc 142 to its open position. This action allows water to flow across the radial flow ports 156 through the main chamber 158 to the outlet port 70 of the regulator 20 without routing the water through the diaphragm chamber 86 to produce the main flow. Thus, the relatively high pressure water entering into the regulator 20 from the supply does not directly act on the diaphragm membrane 78 and instead, acts on the disc 142 so as to substantially isolate the diaphragm membrane 142 from the higher water pressure. During conditions of higher demand, a small pilot flow will still flow into the diaphragm chamber 86 out the bulkhead outlet port 130 and around the check ball 138, however, this flow of water is insufficient to satisfy the higher demand for water by the poultry. The small pilot flow does not subject the diaphragm membrane 78 to the higher pressure water entering into the regulator 20 from the supply.

In addition, if connector 180 and a stand pipe are provided, water from the main chamber 84 is vented through the outlet port 192 in the bottom wall 51 of the body 32 and through outlet conduit 194 to the stand pipe. This measures the outlet pressure of the regulator 20 under higher-demand flow conditions.

F. "Boost" Of System Pressure During Higher-Demand Conditions

Additionally, during higher-demand conditions, the ejector configuration 136 in the outlet flow path, with increased flow, produces an artificially low feed back pressure to the diaphragm chamber 86 and causes the regulator to "boost" its system pressure thereby compensating for pressure loss in the connected watering system by causing the valving regions 148 of the main valve disc 142 to open more fully. This mitigates the typical sag in system pressure under conditions of higher flow demands. This "boost" characteristic in delivered pressure at higher flow rates serves to maintain an adequate delivery of drinking water throughout the watering system during periods of higher demand, and will also allow a single regulator to provide satisfactory supply of drinking water to much longer runs.

More specifically, when water flows into the outlet 70 around the circumference of the portion of the ejector tube 136 which extends into the outlet throat 72, the velocity of the water increases. Once beyond the point of extension of the ejector tube 136 into the throat 72, the velocity of the water decreases which causes a decrease in pressure across the face 137 of the ejector tube 136. This creates an artificially low feedback pressure in the diaphragm chamber 86 which, in effect, "fools" the main valve disc 142 into opening even further because the disc 142 senses that the pressure on the upperside of the disc 142 in the control chamber 158 is less than it would be without the ejector tube 136 in place. This causes the regulator system pressure to increase as the flow rate increases, making up for pressure loss in the piping of the connected watering system normally associated with this higher flow condition.

If desired, but clearly not essential, a series of bypass holes may be formed about the base of the ejector tube 136 to back flood the tube 136 to tailor the "boost" in regulator system pressure to match the watering system pressure losses during periods of higher demand for drinking water. The bypass holes back fill and partially defeat the effect of the ejector tube 136 and the size and number of these bypass holes provide the calibration of the pressure signal from the ejector tube 136 to the diaphragm chamber 86. The reduction in pressure provided by the ejector tube 136, under flowing conditions, is in proportion to the inverse of the water velocity squared, or for a doubling of the water velocity, the ejector tube 136 will reduce feedback pressure by a factor of four.

Since the pressure in the diaphragm chamber 86 is constantly bled off during a very high demand for water and/or a flushing condition, only a minimal amount of pressure is placed on the diaphragm membrane 78. This presents a significant improvement over prior art regulators which, during conditions of very high demand and/or flushing, place a great amount of stress on the diaphragm membrane. Since only a minimal amount of pressure, and thus stress, is placed on the diaphragm membrane 78 in the novel pressure regulator 20 of the present invention during flushing, the diaphragm membrane 78 will last longer and maintain its resiliency longer so that it will respond more accurately over its life than diaphragms in prior art regulators.

As the demand for water tapers off, the pressure on the outlet throat 72 drops but the buoyant check ball 138 remains unseated from engagement with the tapered seat 132. The diaphragm chamber 86 slowly re-pressurizes by the pilot flow described hereinabove thereby placing a minimal amount of stress on the diaphragm membrane 78 during the re-pressurization of the chamber 86. Once a sufficient amount of water pressure is present in the control chamber 158, the force on the topside of the main valve disc 142, due to the water pressure in the control chamber 158 acting on the larger, upper surface area of the disc 142, once again becomes greater than the force on the underside of the disc 142, due to the water pressure from the inlet acting on the smaller, lower surface area of the disc 142, thereby moving the valving region 148 of the main valve disc 142 into engagement with the main valve seat 140 to prevent flow via the radial flow ports 156 in the valve cup 154.

If the demand for water remains relatively low, the regulator 20 functions as described hereinabove with respect to the description of relatively low system demand flow. If the demand for water becomes higher again, the regulator 20 functions as described hereinabove with respect to the description of higher-demand flow. If there is no demand for water, the regulator 20 returns to its standby state as described hereinabove.

G. Override Control For Flushing The Regulator

The regulator 20 of the present invention also includes an override control for venting the diaphragm chamber 86 to protect and isolate the diaphragm membrane 78 during a flush of the regulator 20 and the associated watering system. The override control is provided by the spring loaded poppet 168 that, when depressed, provides external venting of the diaphragm chamber 86 and, in conjunction with the check ball 138, isolates the diaphragm chamber 86 from the outlet pressure section of the regulator 20 so as not to subject the diaphragm membrane 78 to excessive pressure.

When the poppet 168 is depressed, the poppet 168 vents and drains the water in the diaphragm chamber 86 of the regulator 20 to atmosphere. The poppet 168 latches in the depressed, open position by pressing the poppet stem 170 inward, and offsetting the poppet stem 170 to engage the poppet shoulder 176 on the corresponding face on the regulator body 20.

Once the poppet 168 is opened, the water drains from the diaphragm chamber 86 through the drainage ports 134, 56 through the bulkhead 34 and the body 32. Since the water is drained from the diaphragm chamber 86, an insufficient amount of pressure remains in the diaphragm chamber 86 to maintain the reference spring 90 in the compressed state. As such, the reference spring 90 expands to open the pilot orifice 128 as described hereinabove. When the diaphragm chamber 86 is vented, a pressure differential is created across the bulkhead 34 in the direction of the diaphragm chamber 86, which captures the buoyant check ball 138 and drives it into sealing engagement with the corresponding tapered seat 132 formed in the bulkhead 34. This isolates the diaphragm chamber 86 from the regulator outlet pressure, and causes the regulator 20 to "run away" with only pilot flow entering into the diaphragm chamber 86 and subsequently draining from the diaphragm chamber 86 through the drainage ports 134, 56 opened by the poppet 168 to the exterior of the regulator 20.

To flush the regulator 20 and the system, the water is turned on and flows from the supply to the inlet conduit 60 and against the main valve disc 142. Since the water has been drained from the diaphragm chamber 86, the pressure in the control chamber 158 is rapidly bled off and the valving regions 148 of the main valve disc 142 lift away from the main valve seat 140 to expose the radial flow ports 156 in the valve cup 152 as described hereinabove. Water flows from the supply through the inlet conduit 60, between the lifted main valve disc 142 and the main valve seat 140; across the radial flow ports 156 in the valve cup 152 and out the outlet throat 72. Some water will drain out from the main chamber 84 through the drainage port 56. Thus, even with the regulator outlet 70 blocked, and full supply pressure being delivered to the regulator outlet 70 by the open valve disc 142, the back pressure acting on the diaphragm membrane 78 is reduced to zero by virtue of the vented diaphragm chamber 86.

Under typical operating conditions, the pilot flow, with the main valve 142 open, is between 40 and 60 cubic centimeters per minute. When the poppet 168 is reseated, the pilot flow gradually recharges the diaphragm chamber 86, lifting the diaphragm membrane 78 against the reference spring 90, and closing off the pilot flow. The time required to lift the diaphragm membrane 78 and end pilot flow from a vented state is between three and five seconds. When a sufficient amount of pressure is present in the control chamber 158, the main valve disc 142 closes, and as down stream pressure bleeds off, the check ball 138 will unseat, and the regulator 20 will begin to operate as described hereinabove.

Note that a pressure setting must exist for the regulator 20 to properly provide the flush-out function, since the lever return spring 164 must be overcome by the reference spring force to open the pilot circuit. This feature helps to avoid a situation where a dry, connected watering system might be subjected to a damaging hydraulic shock, or "water hammer" by sudden charging of the dry system with high pressure, high velocity water.

H. Adjustment Of The Regulator For Shutting Off The Water Supply

Another feature which should be noted is that the regulator 20 of the present invention provides for the ability to completely shut off the water supply provided through the regulator to the watering system for maintenance purposes or the like. The regulator 20 of the present invention shuts off the water supply when the adjustment knob 92 is turned all the way towards decrease so that there is relatively little, if any, pressure being exerted on the diaphragm membrane 78 by the spring leader member 96 which causes the lever 160 to close via the lever return spring 164 to reseat the pilot seat 166 in the pilot orifice 128. That is, when the knob 92 is turned all the way to cause the spring follower member 94 to translate upwardly towards the top wall of the knob 92, this allows the reference spring 90 to expand to its fullest extent to take the pressure off of the spring leader member 96 and thereby take the pressure off of the diaphragm membrane 78. This prevents the stem portion 126 of the spring leader member 96 from acting against the lever 162 such that the lever 160 is closed via the lever return spring 164 thereby reseating the pilot seat 166 in the pilot orifice 128.

When this condition is placed on the regulator 20, the diaphragm membrane 78 is not flexed which allows all of the water to drain from the diaphragm chamber 86 and the main chamber 84. Water remains in the control chamber 158 and in the inlet conduit 62 to equalize the pressure around the main valve disc 142 so that the main valve disc 142 remains seated with the main valve seat 140. The inlet system pressure is insufficient to overcome the lever return spring 164 to cause the lever 160 to pivot, unseat the pilot seat 166 and reopen the pilot orifice 128 so that the diaphragm chamber could be filled. Thus, water is not introduced into the diaphragm chamber 86 and therefore, water cannot flow out the regulator 20. In addition, the main valve disc 142 remains seated due to the equal pressures so that the main chamber 84 cannot refill with water.

I. Other Features Of The Pressure Regulator

Yet another feature of note is that the regulator construction, and in particular, the top works structure 22, which provides clamping of the diaphragm membrane 78 to the bottom works structure 24, adjustable containment of the reference spring 90, and the non-rising adjustment knob 92, is comprised of a relatively few number of parts which are simple to produce in plastic materials by conventional molding operations. This enables a manufacturer to produce the novel regulator 20 of the present invention at a low cost. The top works structure 22 also provides backup surfaces to protect the diaphragm assembly 30 from over stroke or over pressure conditions.

The top works structure 22 can also be configured with a conventional gland type seal between the adjustment knob 92 and the cover 28 which, along with suitable sealing of the cover rim, would seal the diaphragm chamber 86 and with a suitable connecting port, allow the introduction of a separate pressure to the reference side of the diaphragm membrane 78. This is useful for differential pressure control applications.

While the terms "top" and "bottom" have been used in describing the present invention, it is to be understood that this does not denoted a preferred orientation of the regulator 20 of the present invention. In actuality, in the preferred embodiment, the regulator 20 is oriented such that the outlet conduit is parallel to the floor or ground.

While a preferred embodiment of the present invention is shown and described, it is envisioned that those skilled in the art may devise various modifications of the present invention without departing from the spirit and scope of the appended claims.

The invention claimed is:

1. A pressure regulator for supplying water to an associated watering system comprising: a housing having an inlet through which water flows into the regulator and an outlet through which water flows out from the regulator; a diaphragm positioned within the housing; and isolating structure for substantially isolating said diaphragm from higher water pressure in said regulator during a flushing period of said regulator, said isolating structure comprising a bulkhead dividing said housing and defining a main chamber and a diaphragm chamber, said bulkhead having a bulkhead inlet for allowing the flow of water from said housing inlet into said diaphragm chamber and a bulkhead outlet for allowing the flow of water from said diaphragm chamber to said housing outlet; valving structure for selectively blocking said bulkhead outlet, and draining structure which can be selectively activated for draining the water in said diaphragm chamber from said diaphragm chamber such that said pressure in said diaphragm chamber reaches approximately atmospheric pressure.

2. A pressure regulator as defined in claim 1, wherein said draining structure comprises a poppet which can be moved into said housing to selectively provide a passageway from said diaphragm chamber to atmosphere to drain the diaphragm chamber.

3. A pressure regulator for supplying water to an associated watering system comprising: a housing having an inlet through which water flows into the regulator and an outlet through which water flows out from the regulator; a diaphragm positioned within the housing; and isolating structure for substantially isolating said diaphragm from higher water pressure in said regulator during a flushing period of said regulator, said isolating structure comprising a bulkhead dividing said housing and defining a main chamber and a diaphragm chamber, said bulkhead having a bulkhead inlet for allowing the flow of water from said housing inlet into said diaphragm chamber and a bulkhead outlet for allowing the flow of water from said diaphragm chamber to said housing outlet; valving structure for selectively blocking said bulkhead outlet; and venting structure for selectively venting the water pressure in said diaphragm chamber to atmosphere comprising a poppet which can be moved into said housing to selectively provide a passageway from said diaphragm chamber to atmosphere to vent the diaphragm chamber, said poppet being spring loaded and having a shoulder which can be offset to engage a corresponding shoulder on said housing to open said poppet.

4. A pressure regulator for supplying water to an associated watering system comprising: a housing having an inlet through which water flows into the regulator and an outlet through which water flows out from the regulator; a diaphragm positioned within the housing; and isolating structure for substantially isolating said diaphragm from higher water pressure in said regulator during a flushing period of said regulator, said isolating structure comprising a bulkhead dividing said housing and defining a main chamber and a diaphragm chamber, said bulkhead having a bulkhead inlet for allowing the flow of water from said housing inlet into said diaphragm chamber and a bulkhead outlet for allowing the flow of water from said diaphragm chamber to said housing outlet; valving structure for selectively blocking said bulkhead outlet comprising a buoyant check ball which can be driven into a seat around said bulkhead outlet to close said bulkhead outlet; and venting structure for selectively venting the water pressure in said diaphragm chamber to atmosphere comprising a poppet which can be moved into said housing to selectively provide a passageway from said diaphragm chamber to atmosphere to vent the diaphragm chamber.

5. A pressure regulator as defined in claim 1, further including main valving structure for selectively allowing said water to be directed from said housing inlet directly to said main chamber and subsequently to said housing outlet.

6. A pressure regulator as defined in claim 5, wherein said main valving structure comprises a valve in association with said housing inlet and said bulkhead inlet and which normally closes a passageway from said housing inlet to said main chamber and which can be selectively biased to an open position to open the passageway from said housing inlet to said main chamber to allow water to flow directly from said housing inlet to said main chamber and subsequently to said housing outlet.

7. A pressure regulator as defined in claim 6, wherein said valve is elastomeric having an aperture therethrough which is in fluid communication with said housing inlet and said bulkhead inlet, said aperture in said valve allowing water to pass from said housing inlet, through said valve and said bulkhead inlet and into said diaphragm chamber.

8. A pressure regulator as defined in claim 6, wherein said valve is elastomeric and said elastomeric valve is biased to said open position by a flexing of said elastomeric valve in response to a higher demand for water condition, said elastomeric valve being engaged within a cup which is connected between said bulkhead and said housing inlet, said cup having a plurality of flow ports through which water flows when said elastomeric valve is flexed to the open position.

9. A pressure regulator as defined in claim 8, wherein said housing inlet has a main valve seat formed thereon and said elastomeric valve includes a valving region which is in selective engagement with said main valve seat, wherein when said elastomeric valve flexes, said valving region of said elastomeric valve lifts away from engagement with said main valve seat to allow water to flow through said flow ports in said cup.

10. A pressure regulator for supplying water to an associated watering system comprising: a housing having an inlet through which water flows into the regulator and an outlet through which water flows out from the regulator; a diaphragm positioned within the housing; a bulkhead within said housing defining a main chamber and a diaphragm chamber, said bulkhead having a bulkhead inlet for allowing a flow of water from said housing inlet into said diaphragm chamber and a bulkhead outlet for allowing the flow of water from said diaphragm chamber to said housing outlet, and an ejector tube arrangement associated with said housing outlet for boosting the delivered pressure of water through said regulator under a higher demand condition for water to increase the amount of water flowing through said regulator, said ejector tube arrangement comprising a tubular projection operatively associated with said housing outlet and extending a predetermined distance into said housing outlet to increase the velocity of the water flow and produce an artificially low feed back pressure to the diaphragm chamber.

11. A pressure regulator for supplying water to an associated watering system comprising: a housing having a top structure and a bottom structure, said top and bottom structure being connected together; said bottom structure having an inlet through which water flows into the regulator and an outlet through which water flows out from the regulator and including a bulkhead therein; said top structure including a cover member which houses a reference spring therein; a diaphragm connected to said cover member and in engagement with said reference spring, and setting structure for setting said reference spring to a desired compression level for adjustment of the regulator outlet pressure setting which includes a knob attached to said cover member, one of said knob or said cover member having a plurality of tines thereon which engage in spaces provided between a plurality of ribs on the other of said knob or said cover member, said tines deterring rotation of said knob by engaging against said ribs when said knob is rotated.

12. A pressure regulator as defined in claim 11, wherein said setting structure includes said knob and further includes a spring follower member in association with said knob and said reference spring such that when said knob is moved, said spring follower member moves and causes said reference spring to flex said diaphragm.

13. A pressure regulator as defined in claim 12, wherein said spring follower member and said knob are connected together by a screw member, said knob being rotated to rotate said screw member which causes said spring follower member to translate.

14. A pressure regulator as defined in claim 11, wherein means are provided for completely preventing water from entering the inlet.

15. A pressure regulator as defined in claim 12, further including a plurality of cam surfaces on said knob and said spring follower member.

16. A pressure regulator as defined in claim 12, further including a connector member attached to said inlet, said connector member being capable of having a stand pipe attached thereto for measuring the outlet pressure of said regulator and a supply means attached thereto for providing water to said regulator.

17. A pressure regulator for supplying water to an associated watering system comprising: a housing having an inlet through which water flows into the regulator and an outlet through which water flows out from the regulator; a diaphragm positioned within the housing; a bulkhead within said housing defining a main chamber and a diaphragm chamber, said bulkhead having an inlet for allowing the flow of water from said housing inlet into said diaphragm chamber and an outlet for allowing the flow of water from said diaphragm chamber to said housing outlet; isolating structure for isolating said diaphragm from higher water pressure in said regulator during flushing comprising valving structure for selectively blocking said bulkhead outlet and further including a poppet structure which can be selectively activated for draining the water in said diaphragm chamber from said diaphragm chamber such that said pressure in said diaphragm chamber reaches approximately atmospheric pressure, said poppet structure being moved into said housing to selectively provide an opening from said diaphragm chamber to atmosphere to vent the diaphragm chamber; and further including a main valve in association with said housing inlet and said bulkhead inlet which normally closes a passageway from said housing inlet to said main chamber and which can be selectively biased to an open position to open the passageway from said housing inlet to said main chamber to allow water to flow directly from said housing inlet to said main chamber and subsequently to said housing outlet.

18. A pressure regulator for supplying water to an associated watering system comprising: a housing having an inlet through which water flows into the regulator and an outlet through which water flows out from the regulator; a diaphragm positioned within the housing; isolating structure for substantially isolating said diaphragm from higher water pressure in said regulator during flushing, a bulkhead dividing said housing and defining a main chamber and a diaphragm chamber, said bulkhead having a bulkhead inlet for allowing the flow of water from said housing inlet into said diaphragm chamber and a bulkhead outlet for allowing the flow of water from said diaphragm chamber to said housing outlet; said isolating structure comprising valving structure for selectively blocking said bulkhead outlet and a poppet structure for selectively venting the water pressure in said diaphragm chamber to atmosphere, said poppet structure being spring loaded and having a shoulder which can be offset to engage a corresponding shoulder on said housing to open said poppet structure and to move said poppet structure into said housing to selectively provide an opening from said diaphragm chamber to atmosphere to vent the diaphragm chamber; and further including a main valve in association with said housing inlet and said bulkhead inlet and which normally closes a passageway from said housing inlet to said main chamber and which can be selectively biased to an open position to open the passageway from said housing inlet to said main chamber to allow water to flow directly from said housing inlet to said main chamber and subsequently to said housing outlet.

19. A pressure regulator for supplying water to an associated watering system comprising: a housing having an inlet through which water flows into the regulator and an outlet through which water flows out from the regulator; a diaphragm positioned within the housing; isolating structure for substantially isolating said diaphragm from higher water pressure in said regulator during flushing, said bulkhead dividing said housing and defining a main chamber and a diaphragm chamber, said bulkhead having a bulkhead inlet for allowing the flow of water from said housing inlet into said diaphragm chamber and a bulkhead outlet for allowing the flow of water from said diaphragm chamber to said housing outlet; said isolating structure comprising valving structure for selectively blocking said bulkhead outlet comprising a buoyant check ball which can be driven into a seat around said bulkhead outlet to close said bulkhead outlet and a poppet for selectively venting the water pressure in said diaphragm chamber to atmosphere, said poppet structure being moved into said housing to selectively provide an opening from said diaphragm chamber to atmosphere to vent the diaphragm chamber; and further including a main valve in association with said housing inlet and said bulkhead inlet and which normally closes a passageway from said housing inlet to said main chamber and which can be selectively biased to an open position to open the passageway from said housing inlet to said main chamber to allow water to flow directly from said housing inlet to said main chamber and subsequently to said housing outlet.

20. A pressure regulator as defined in claim 17, wherein said valve is an elastomeric disc having an aperture therethrough which is in fluid communication with said bulkhead inlet, said aperture in said disc allowing water to pass from said housing inlet, through said disc and said bulkhead inlet and into said diaphragm chamber.

21. A pressure regulator as defined in claim 20, wherein said main valve is biased to said open position by a flexing of said valve in response to a higher demand for water condition, said elastomeric valve being engaged within a cup which is connected between said bulkhead and said housing inlet, said cup having a plurality of flow ports through which water flows when said elastomeric valve is flexed to the open position.

22. A pressure regulator for supplying water to an associated watering system comprising: a housing having a top structure and a bottom structure, said top and bottom structure being connected together; said top structure including a cover member which houses a reference spring therein; a diaphragm membrane connected to said cover member and in engagement with said reference spring, a knob attached to said cover member and a spring follower member in association with said knob and said reference spring such that when said knob is moved, said spring follower member moves and causes said reference spring to flex said diaphragm membrane; said bottom structure including a body and a bulkhead which is removably seated within said body, said body having an inlet through which water flows into the regulator and an outlet through which water flows out from the regulator, said bulkhead defining a main chamber between said bulkhead and said housing and a diaphragm chamber between said bulkhead and said diaphragm, said bulkhead having an inlet for allowing the flow of water from said housing inlet into said diaphragm chamber and an outlet for allowing the flow of water from said diaphragm chamber to said housing outlet; an elastomeric valve in association with said housing inlet and said bulkhead inlet and which normally closes a passageway from said housing inlet to said main chamber and which can be selectively biased to an open position to open the passageway from said housing inlet to said main chamber to allow water to flow directly from said housing inlet to said main chamber and subsequently to said housing outlet; an ejector tube arrangement associated with said housing outlet for boosting a flow of water through said regulator under a higher demand condition for water, said ejector tube arrangement including a small diameter tubular projection in association with said bulkhead outlet and a larger diameter tapered tube in association with said housing outlet, said tubular projection extending a predetermined distance into said tapered tube associated with said housing outlet; a poppet structure associated with said bulkhead which can be moved into said housing to selectively provide a passageway from said diaphragm chamber to atmosphere to vent the diaphragm chamber; and a buoyant check ball which can be driven into a seat around said bulkhead outlet to close said bulkhead outlet.

23. A pressure regulator as defined in claim 22, wherein said housing inlet has a main valve seat formed thereon and said elastomeric main valve includes a valving region which is in selective engagement with said main valve seat, wherein when said main valve flexes, said valving region of said main valve lifts away from engagement with said main valve seat to allow water to flow through flow ports in said main valve seat.

24. A pressure regulator as defined in claim 22, wherein said knob can be rotated such that said reference spring is fully expanded so that said diaphragm is not flexed, and so that water is completely prevented from entering said inlet.

25. A pressure regulator as defined in claim 22, further including a connector member attached to said inlet, said connector member being capable of having a stand pipe attached thereto for measuring the outlet pressure of said regulator and a supply means attached thereto for providing water to said regulator.

26. A pressure regulator as defined in claim 11, wherein said knob has a smooth exterior surface.

* * * * *